United States Patent
Peron et al.

(10) Patent No.: US 8,854,020 B2
(45) Date of Patent: Oct. 7, 2014

(54) MULTIPLE-LEVEL SWITCHED-MODE POWER SUPPLY

(75) Inventors: Benoît Peron, Tours (FR); David Jouve, Tours (FR)

(73) Assignee: STMicroelectronics (Tours) SAS, Tours (FR)

(*) Notice: Subject to any disclaimer, the term of this patent is extended or adjusted under 35 U.S.C. 154(b) by 63 days.

(21) Appl. No.: 12/960,331

(22) Filed: Dec. 3, 2010

(65) Prior Publication Data

US 2011/0140521 A1    Jun. 16, 2011

(30) Foreign Application Priority Data

Dec. 16, 2009 (FR) ........................... 09 59067

(51) Int. Cl.
*H02M 3/158* (2006.01)
*G09G 3/32* (2006.01)
*H02M 1/00* (2006.01)

(52) U.S. Cl.
CPC .......... *H02M 3/1588* (2013.01); *Y02B 70/1466* (2013.01); *G09G 3/3225* (2013.01); *H02M 2001/009* (2013.01); *G09G 2330/028* (2013.01)
USPC .......................................... 323/272; 323/259

(58) Field of Classification Search
USPC ................ 323/272, 222–224, 259, 282–285; 315/224, 226, 104, 106, 209
See application file for complete search history.

(56) References Cited

U.S. PATENT DOCUMENTS

| | | | | |
|---|---|---|---|---|
| 5,483,125 A * | 1/1996 | Kachmarik | .................... | 315/106 |
| 5,740,021 A * | 4/1998 | Lecheler et al. | .................. | 363/37 |
| 6,208,541 B1 * | 3/2001 | Itoh et al. | ......................... | 363/98 |
| 6,426,597 B2 * | 7/2002 | Rast et al. | ...................... | 315/219 |
| 7,050,027 B1 | 5/2006 | Macrae | | |
| 7,268,525 B2 * | 9/2007 | Ishii et al. | ...................... | 323/282 |
| 2006/0017672 A1 | 1/2006 | Aoki | | |
| 2006/0071611 A1 * | 4/2006 | Van Casteren | ................ | 315/225 |
| 2008/0012502 A1 * | 1/2008 | Lys | ................................ | 315/247 |
| 2008/0174287 A1 | 7/2008 | Park | | |
| 2008/0303502 A1 * | 12/2008 | Haiplik | ......................... | 323/283 |
| 2009/0026977 A1 | 1/2009 | Omi | | |
| 2009/0027311 A1 * | 1/2009 | Lee et al. | ......................... | 345/76 |
| 2009/0267528 A1 * | 10/2009 | Nijhof et al. | .................. | 315/226 |
| 2010/0117548 A1 * | 5/2010 | Muehlschlegel | .............. | 315/224 |

FOREIGN PATENT DOCUMENTS

JP    2004350471 A    12/2004

OTHER PUBLICATIONS

French Search Report dated Aug. 20, 2010 from corresponding French Application No. 09/59067.

* cited by examiner

*Primary Examiner* — Gary L Laxton
*Assistant Examiner* — Trinh Dang
(74) *Attorney, Agent, or Firm* — Allen, Dyer, Doppelt, Milbrath & Gilchrist, P.A.

(57) ABSTRACT

A circuit for providing at least two power supply voltages from a D.C. voltage provided by a first switched-mode converter between a first and a second terminals, wherein: a second reversible buck-type switched-mode converter is powered with said D.C. voltage; a capacitive dividing bridge connects said first and second terminals, the midpoint of the capacitive dividing bridge corresponding to the output of the second converter and defining a third terminal of provision of an intermediary potential; and said two power supply voltages are respectively sampled between the first and third and between the third and second terminals.

19 Claims, 3 Drawing Sheets

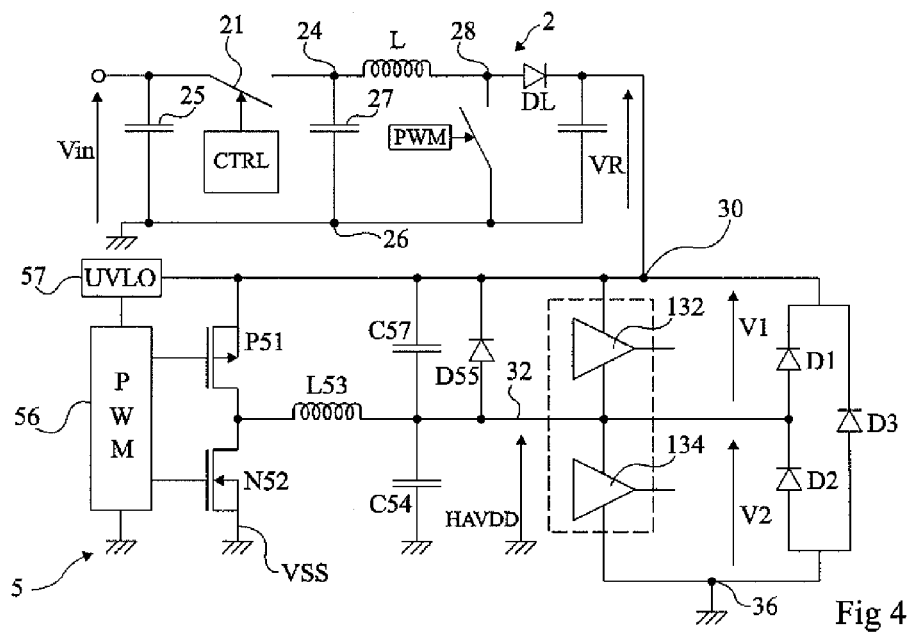
Fig 4
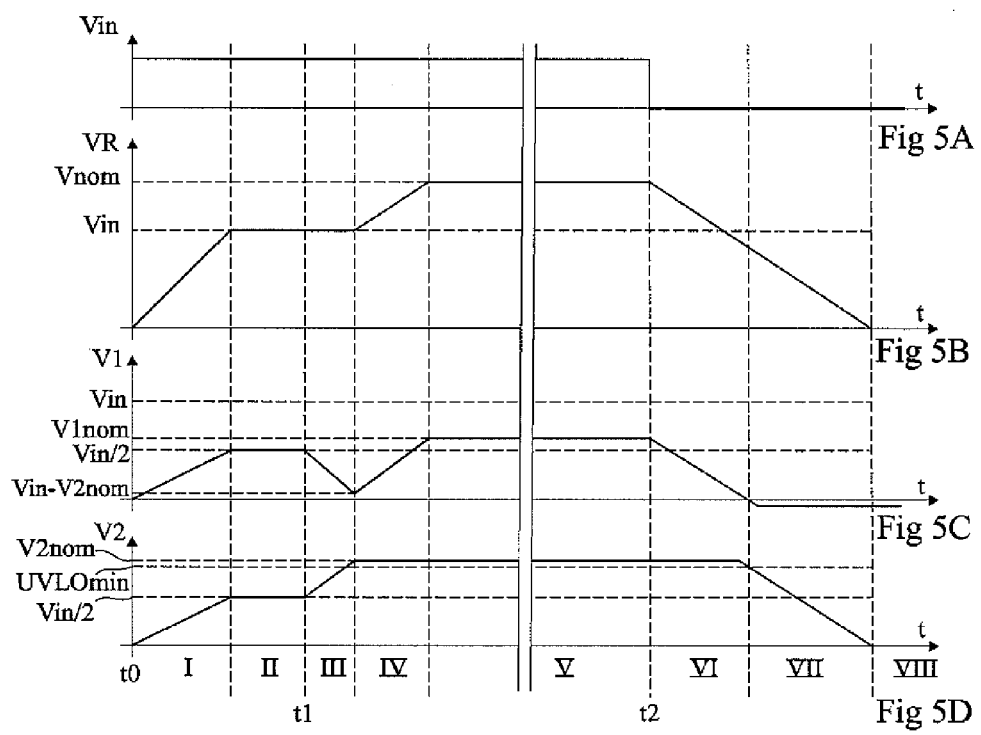
Fig 5A
Fig 5B
Fig 5C
Fig 5D

US 8,854,020 B2

MULTIPLE-LEVEL SWITCHED-MODE POWER SUPPLY

CROSS REFERENCE TO RELATED APPLICATIONS

This application claims the priority benefit of French patent application number 09/59067, filed on Dec. 16, 2009, entitled "Multiple-Level Switched-Mode Power Supply," which is hereby incorporated by reference to the maximum extent allowable by law.

BACKGROUND OF THE INVENTION

1. Field of the Invention

The present invention generally relates to electronic circuits and, more specifically, to power supply circuits of switched-mode power supply type.

The present invention more specifically applies to switched-mode power supplies intended for display screens, in particular, liquid crystal (LCD) or to active-matrix organic light-emitting diodes (AMOLED) displays.

2. Discussion of the Related Art

FIG. 1 is a simplified block diagram of a display screen, for example, a liquid crystal display of the type to which the present invention more specifically applies.

The display comprises an array 12 of liquid crystal cells controlled by row control circuits 14 (SCAN DRIVERS) and by column control circuits 16 (COLUMN DRIVERS). Circuits 14 and 16 are powered and controlled by circuit 18 (CTRL+POWER) comprising one or several switched-mode power supply circuits.

The display cells require a relatively high power supply voltage (greater than 10 volts, generally on the order of 15 volts) with respect to the voltage that so-called low-voltage components can withstand (less than 10 volts). The cells are generally powered by column drivers 16. These circuits are in a large number (in practice, one per column or one for two columns) and, for integration and miniaturization needs, these circuits are attempted to be formed in a finer technology than that required to withstand the relatively high voltage. For this purpose, column drivers using an intermediary voltage are formed, so that the components of these circuits only have to withstand approximately half of the otherwise required voltage.

The column drivers are then made in the form of cyclic digital-to-analog converters each equipped with an array of switches enabling to select the power supply voltage from among the voltage between the relatively high potential and an intermediary potential and the voltage between the intermediary potential and the reference potential.

The problem of providing these three potentials is then posed.

FIG. 2 is a partial view of a circuit for generating an intermediary voltage, noted HAVDD, between a relatively high voltage VR and ground GND. Voltage VR is provided by a circuit of switched-mode power supply type, powered with a voltage $V_{IN}$. In applications to liquid crystal displays and to AMOLED-type displays more specifically aimed at by the present invention, voltage $V_{IN}$ is on the order of 12 volts and voltage VR is on the order of from 15 to 18 volts. Power converter 2 is of boost type. It comprises a switch K controlled by pulse-width modulation (block 22, PWM) to switch the current build-up in an inductive element L. For a boost converter, the inductive element and switch K are in series between two terminals 24 and 26 of application of a D.C. voltage. A free wheel diode D, in series with an output capacitor C, connects junction point 28 of inductance L and of switch K to ground 26. Output voltage VR is sampled across capacitive element C. On the power supply voltages side, voltage $V_{IN}$ is, in practice, applied via a switch 21. This switch connects a terminal 23 of application of voltage $V_{IN}$ to terminal 24. Generally, two capacitive smoothing elements 25 and 27 respectively connect terminals 23 and 24 to ground 26. Switch 21 is controlled, for example, by a circuit 29 (CTRL). This circuit may correspond to an output circuit of the display stand-by mode or to any other turn-on switch.

To generate intermediary voltage HAVDD from voltage VR, a follower assembly associated with a resistive dividing bridge formed of two resistors in series between terminal 30 of provision of voltage VR and ground GND is generally used. Their junction point is connected to a non-inverting input of a follower-assembled operational amplifier 34 (having its output terminal looped back on the inverting input). Generally, the intermediary voltage corresponds to half of supply voltage VR. Accordingly, resistors R of same value are used.

On the display side, each column control stage 13 comprises two amplifiers 132 and 134 having their respective outputs intended to be connected via switches, respectively 136 and 138, to a first electrode of a cell 122 of the display, the other electrode of this cell being directly connected to terminal 32 for providing intermediary voltage HAVDD. Switches 136 and 138 are alternately controlled according to the need to bring the first electrode of the cell to a voltage greater than the intermediary voltage or to a lower voltage. For simplification, a single cell 122 has been shown, but it should be noted that a same column amplifier 13 powers all the cells of a same column which are selected by the scan drivers (14, FIG. 1). Amplifiers 132 and 134 receive control signals corresponding to the illumination reference values, as will be better understood hereafter in relation with the discussion of FIG. 3, this operation being known per se.

Elements of protection against electrostatic discharges are provided for the power supply circuit. Typically two diodes D1 and D2 respectively connect terminals 30 and 32 and terminals 32 and 36, their respective anodes being on the side of terminal 32 and on the side of terminal 36, while a third diode D3 connects terminals 30 and 36, its anode being on the side of terminal 36. Although they have been shown on the display side, these elements are generally connected on the column driver side (16, FIG. 1).

A disadvantage of the power supply circuit of FIG. 2 is the dissipation generated by resistors R of the voltage divider and of amplifier 34.

SUMMARY OF THE INVENTION

An object of an embodiment of the present invention is to provide a multiple-level power supply circuit which overcomes all or part of the disadvantages of usual power supply circuits.

An object of another embodiment of the present invention is to provide a power supply circuit generating a decreased dissipation with respect to the follower circuit.

An object of another embodiment of the present invention is to provide a solution compatible with the use of elements of protection against electrostatic discharges.

Thus, an embodiment of the present invention provides a circuit for providing at least two power supply voltages from a D.C. voltage provided by a first switched-mode converter between a first and a second terminals, wherein:

a second reversible buck-type switched-mode converter is powered with said D.C. voltage;

a capacitive dividing bridge connects said first and second terminals, the midpoint of the capacitive dividing bridge corresponding to the output of the second converter and defining a third terminal of provision of an intermediary potential; and said two power supply voltages are respectively sampled between the first and third and between the third and second terminals.

According to an embodiment of the present invention, a diode connects the first and third terminals.

According to an embodiment of the present invention, the circuit further comprises an element for turning off the second switched-mode converter when the D.C. voltage is smaller than a threshold selected to maintain the intermediary potential as long as the D.C. voltage has not reached this intermediary potential.

According to an embodiment of the present invention, diodes of protection against electrostatic discharges are respectively connected between the first and third, between the third and second, and between the first and second terminals.

According to an embodiment of the present invention, said two power supply voltages are intended to power column amplifiers of a liquid crystal or AMOLED-type display.

An embodiment of the present invention also provides a liquid crystal display comprising such a power supply circuit.

An embodiment of the present invention also provides an AMOLED display comprising such a power supply circuit.

The foregoing objects, features, and advantages of the present invention will be discussed in detail in the following non-limiting description of specific embodiments in connection with the accompanying drawings.

BRIEF DESCRIPTION OF THE DRAWINGS

FIG. 4 shows a switched-mode power supply circuit according to an embodiment of the present invention, associated with a column driver and with a device of protection against electrostatic discharges; and FIGS. 5A, 5B, 5C, and 5D are timing diagrams illustrating the operation of the circuit of FIG. 4.

DETAILED DESCRIPTION

Figure 1:
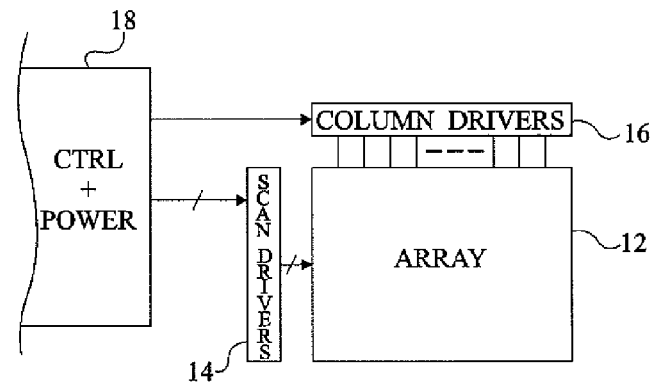
FIG. 1, previously described, is a simplified block diagram of a display of the type to which the present invention applies as an example.

The same elements have been designated with the same reference numerals in the different drawings and, further, the timing diagrams are not drawn to scale. For clarity, only those elements which are necessary to the understanding of the present invention have been shown and will be described.

In particular, the structure of the pixel array of the display has not been detailed, the present invention being compatible with any usual display. Further, the generation of various control signals has not been detailed either, the present invention being here again compatible with usual circuits of generation of such signals.

Figure 2:
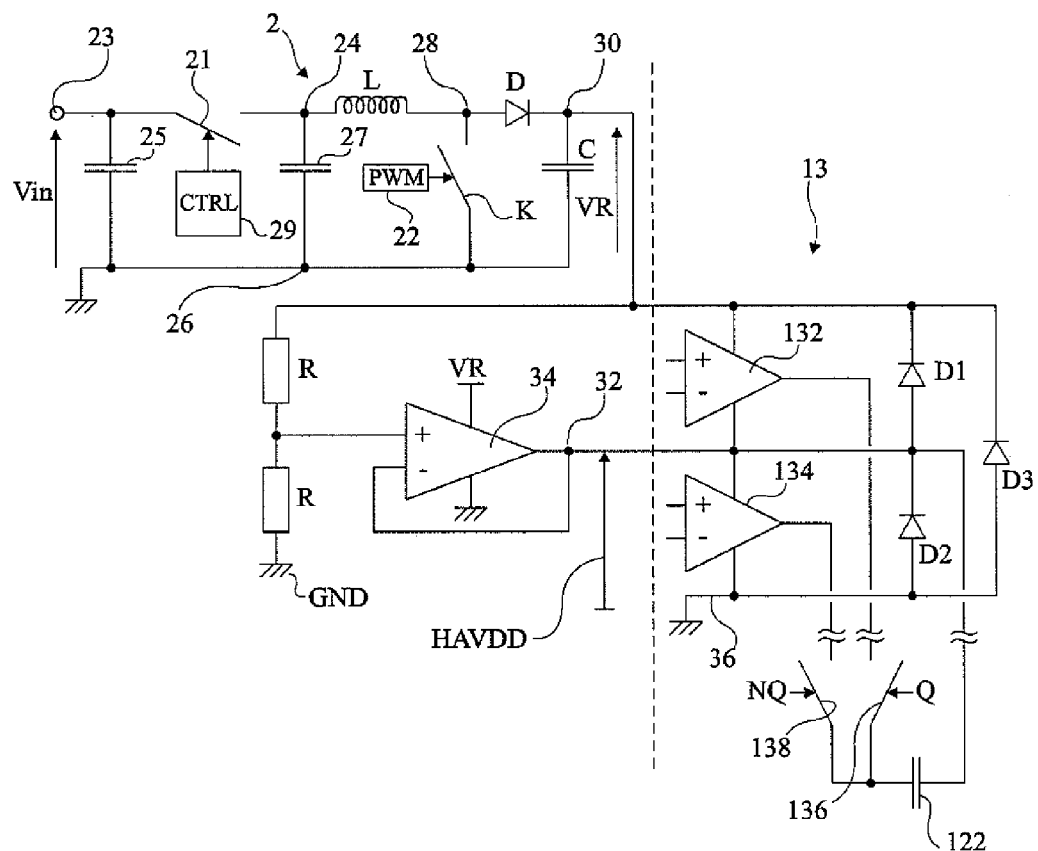
FIG. 2, previously described, is a simplified electric diagram of a usual example of a switched-mode power supply circuit for providing multiple voltages, associated with a column driver and its device of protection against electrostatic discharges.
Figure 3:
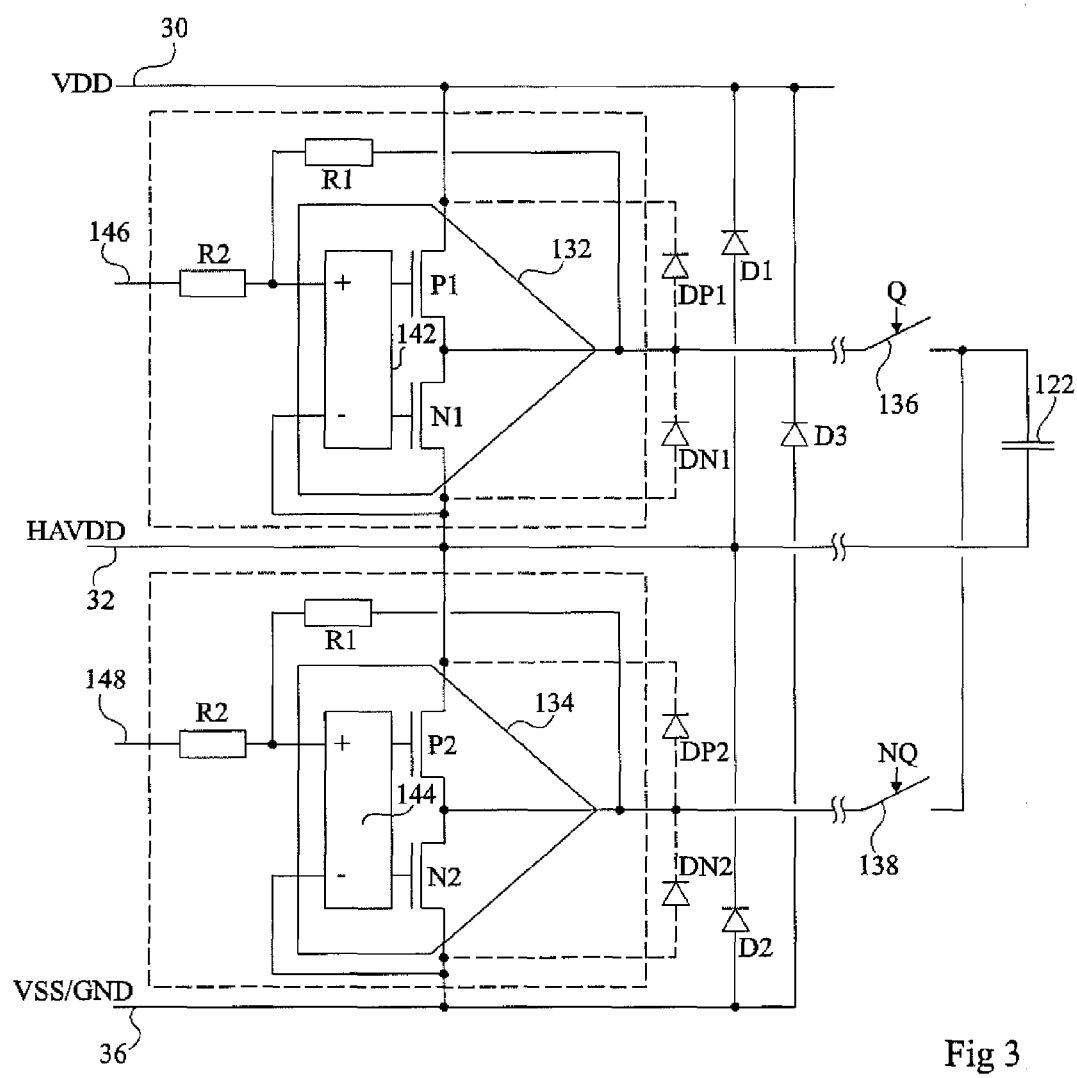
FIG. 3 partially shows the internal structure of the amplifiers of a column driver associated with a circuit of protection against electrostatic discharges.

FIG. 3 schematically shows the internal structures of two amplifiers 132 and 134 of the digital-to-analog converters of the column drivers and especially of their respective output stages. As in FIG. 2, the outputs of amplifiers 132 and 134 have been symbolized as connecting a cell 122 of the display via switches 136 and 138 respectively controlled by a signal Q and its inverse NQ. The output stage of each amplifier comprises two MOS transistors of opposite types, respectively P1, N1 and P2, N2 in series respectively between terminal 30 at potential VR and terminal 32 at potential HAVDD and between terminal 32 and reference terminal 36 (typically, the ground). These transistors are controlled by a differential stage, respectively 142, 144. The respective direct inputs (+) of amplifiers 132 and 134 are connected by resistive elements, respectively R1 and R2, to the output terminal of the concerned amplified and to an input terminal, respectively 146, 148 of the amplifier assembly, originating from the digital-to-analog converters.

A difficulty of the assembly of amplifiers 132 and 134 is that transistors P1, N1, P2, and N2 should be protected against possible electrostatic discharges. Substrate diodes DP1, DN1, DP2, and DN2 (illustrated in dotted lines) are capable of playing this role. However, the current that they are capable of withstanding is not sufficient. This is why diodes D1, D2, and D3 previously described in relation with FIG. 2 are provided.

The system for generating intermediary voltage HAVDD should respect the ESD protection of the amplifiers. In the circuit of FIG. 2, a problem may be posed at the turning-on and at the turning-off of the display where there is a risk for part of diodes D1, D2, and D3 not to reverse-biased, which may damage the display.

FIG. 4 is a partial electric diagram to be compared with that of FIG. 2. This diagram illustrates an embodiment of a circuit 5 for providing an intermediary voltage HAVDD between a high potential VR provided by switched-mode power supply circuit 2 and a low potential (VSS or GND).

A buck-type switched-mode converter is used instead of the follower amplifier of FIG. 2. This converter is a so-called reversible converter, to be able to restore a positive and negative level with respect to intermediary level HAVDD. It comprises two transistors P51 and N52, respectively with a P channel and with an N channel, in series between terminals 30 and 36. The junction point of this series association is connected by an inductance L53 to node 32 for providing voltage HAVDD, grounded by a capacitive element C54. A freewheel diode D55 connects terminals 32 and 30, its anode being connected on the side of terminal 32. The respective gates of transistors P51 and P52 are controlled by a pulse-width modulation circuit 56 (PWM).

Further, another capacitive element C57 connects terminals 30 and 32 to form a capacitive dividing bridge, as will be better understood hereafter.

Preferably, control circuit 56 is powered with voltage VR by a block 57 (UVLO OFF—Under Voltage Lock Out) in charge of decreasing the operating range of the boost converter. This circuit is used at the turning-off of the display to ascertain that voltage HAVDD does not exceed half of voltage VR.

FIGS. 5A, 5B, 5C, and 5D are timing diagrams illustrating the operation of the circuit of FIG. 4. FIG. 5A is an example of the variation of voltage $V_{IN}$ at the input of switched-mode converter 2, that is, across capacitor 27 upstream of control switch 21. FIG. 5B illustrates a corresponding example of the variation of voltage VR. FIGS. 5C and 5D illustrate the variation of voltages V1 and V2 provided across diodes D1 and D2, and thus between the power supply terminals of respective amplifiers 132 and 134.

The switched-mode power supply is assumed to be turned on at a time t0, for example, by the turning-on of switch 21, so that voltage $V_{IN}$ is established across capacitor 27, that is, at the input of switched-mode power supply circuit 2. Circuit 2 has not started to operate. A first phase I then sees the increase of voltage VR under the effect of the switched-mode power supply. Voltages V1 and V2 increase in parallel under the effect of capacitive dividing bridge C57, C54, while circuit 56 has not started to operate yet.

A second phase II starts when voltage VR provided by boost converter 2 reaches level $V_{IN}$. The levels of voltages V1 and V2 are then $V_{IN}/2$, that is, half of the value of voltage $V_{IN}$. Phase II should be as short as possible to avoid an imbalance of voltage HAVDD with respect to level VR and to the ground, for the case where the current pulled from node 32 or provided to this node 32 is greater than CdV/2dt, where C is the value of capacitor C54 or C57, dV is the voltage variation imposed by the current surge, and dt is the duration of phase II.

A third phase III starts from a time t1, during which the buck switched-mode power supply circuit 5 is started. Converter 2 is still off.

It should be noted that in the absence of capacitor C57, voltage V1 would take the same value as voltage VR and no charge of capacitor C54 would be observed, since converter 56 has not started yet.

During phase III, voltage V1 decreases while voltage V2 increases. At the end of phase III, voltage V2 reaches a nominal level V2nom which will be kept during the screen operation. Voltage V1 reaches a level Vin-V2nom.

A fourth phase IV comprises causing, due to switched-mode converter 5, an increase of voltage V1 up to its nominal level. At the end of this phase IV, the display can operate (phase V).

It is assumed that at a time t2, the display is turned off by the disappearing of the voltage at the input of converter 2 (for example, by turning-off of switch 21). Capacitors 25 and 27 are then powered off and a decrease of voltages VR and V1 can be observed (phase VI). During this phase VI, the level of voltage V2 is maintained stable by the converter, which is maintained in operation by circuit 57 to ascertain that voltage VR decreases sufficiently before diode D55 conducts. When voltage VR is sufficiently low and voltage V1 becomes negative, voltage V2 reaches a level UVLOmin and circuit 57 stops. Voltage V2 can then decrease (phase VII) in the equivalent impedances of amplifiers 132 and 134 until it fully disappears (phase VIII).

Value UVLOmin is selected to be smaller than HAVDD-VD55, where VD55 is the voltage drop in conducting diode D55.

Diode D55 protects diode D1 in case of a turning-off under a low load.

Indeed, in such a case, the voltage of terminal 30 is smaller than that of terminal 32. Capacitor C57 then discharges faster than capacitor C54. This would result in the injection into diode D1 of a current which would risk to damage amplifiers 134. With diode D55, a negative voltage is imposed between terminals 30 and 32 which is limited to approximately 0.6 volt (junction voltage of diode D55).

In practice, circuit 57 is for example formed of a comparator of the voltage at node 32 with respect to a reference voltage selected to be smaller than HAVDD minus voltage VD55, the comparator output being used to stop circuit 56.

Converters 2 and 5 are shared for several columns. According to the amount of power to be provided and to the sizing of the components, this converter powers all or part of the screen.

The circuit of FIG. 4 may be extended to supply more than two power supply voltages by providing each time a capacitive startup dividing bridge, a diode equivalent to power-off protection diode D55, and a level UVLOmin(i) smaller than (i*VR/n)-VD55, with n standing for the number of voltages and i ranging between 1 and n−1.

Various embodiments of the present invention have been described.

Various alterations will occur to those skilled in the art. In particular, the number of amplifiers of the display powered by a single circuit depends on the application and on the required power. Similarly, the dimensions to be given to the different components of the circuit of FIG. 4, as well as the provision of the control signals adapted to switched-mode converters, are within the abilities of those skilled in the art based on the functional indications given hereabove and on the aimed application.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for providing at least first and second D.C. power supply voltages from a D.C. voltage provided by a first switched-mode converter between a first terminal and a second terminal, wherein:

a second reversible buck-type switched-mode converter is powered with said D.C. voltage;

a capacitive dividing bridge connects said first and second terminals, a midpoint of the capacitive dividing bridge corresponding to an output of the second converter and defining a third terminal for providing an intermediary D.C. potential, wherein the second converter is configured to provide the intermediary D.C. potential at the third terminal; and said first and second D.C. power supply voltages are respectively sampled between the first and third terminals and between the third and second terminals, wherein the second switched-mode converter comprises a first switching device connected between the first terminal and a junction point, a second switching device connected between the junction point and the second terminal, and an inductor directly connected between the junction point and the third terminal, and wherein the second switched-mode converter is configured to provide said first D.C. power supply voltage to a first load connected between the first and third terminals and to provide said second D.C. power supply voltage to a second load connected between the third and second terminals.

2. The circuit of claim 1, wherein a diode connects the first and third terminals.

3. The circuit of claim 1, further comprising an element for turning off the second switched-mode converter when the D.C. voltage is smaller than a threshold selected to maintain the intermediary potential as long as the D.C. voltage has not reached this intermediary potential.

4. The circuit of claim 1, wherein diodes for protecting against electrostatic discharges are respectively connected between the first and third, between the third and second, and between the first and second terminals.

5. The circuit of claim 1, wherein said two power supply voltages are intended to power column amplifiers of a liquid crystal or AMOLED-type display.

6. A liquid crystal display comprising the power supply circuit of claim 1.

7. An AMOLED display comprising the power supply circuit of claim 1.

8. A switched-mode power supply comprising:
a switched-mode converter receiving a D.C. input voltage between first and second terminals; and
a capacitive dividing bridge connected between the first and second terminals, wherein an intermediate node of the capacitive dividing bridge and an output of the switched-mode converter are directly connected to a third terminal, wherein the switched-mode converter is configured to provide an intermediary D.C. potential at the third terminal, wherein the switched-mode converter comprises a first switching device connected between the first terminal and a junction point, a second switching device connected between the junction point and the second terminal, and an inductor directly connected between the junction point and the third terminal, and wherein the switched-mode converter is configured to provide a first D.C. power supply voltage to a first load connected between the first and third terminals and to provide a second D.C. power supply voltage to a second load connected between the third and second terminals.

9. The switched-mode power supply as defined in claim 8, wherein the capacitive dividing bridge comprises a first capacitor connected between the first terminal and the third terminal and a second capacitor connected between the third terminal and the second terminal.

10. The switched-mode power supply as defined in claim 8, further comprising a diode connected between the first and third terminals.

11. The switched-mode power supply as defined in claim 8, wherein the first and second D.C. power supply voltages are equal.

12. The switched-mode power supply as defined in claim 8, wherein the first and second switching devices comprise P-type and N-type transistors, respectively.

13. The switched-mode power supply as defined in claim 8, configured to power a liquid crystal display.

14. The switched-mode power supply as defined in claim 8, configured to power an active matrix organic light-emitting diode display.

15. The switched-mode converter as defined in claim 8, further comprising a control circuit configured to control the first and second switching devices.

16. The switched-mode converter as defined in claim 15, wherein the control circuit is configured to control the first and second switching devices by pulse width modulation.

17. The switched-mode power supply as defined in claim 15, further comprising a circuit configured to turn off the switched-mode converter when the D.C. input voltage between the first and second terminals is less than a threshold value.

18. The switched-mode converter as defined in claim 8, further comprising a first protection diode connected between the first and third terminals and a second protection diode connected between the third and second terminals.

19. The switched-mode power supply as defined in claim 18, further comprising a third protection diode connected between the first and second terminals.

* * * * *